(12) United States Patent
Yamamoto et al.

(10) Patent No.: US 9,490,679 B2
(45) Date of Patent: Nov. 8, 2016

(54) WHEEL DRIVING DEVICE

(71) Applicants: Ken Yamamoto, Shizuoka (JP); Minoru Suzuki, Shizuoka (JP)

(72) Inventors: Ken Yamamoto, Shizuoka (JP); Minoru Suzuki, Shizuoka (JP)

(73) Assignee: NTN CORPORATION, Osaka (JP)

(*) Notice: Subject to any disclaimer, the term of this patent is extended or adjusted under 35 U.S.C. 154(b) by 64 days.

(21) Appl. No.: 14/373,653

(22) PCT Filed: Jan. 16, 2013

(86) PCT No.: PCT/JP2013/050662
§ 371 (c)(1),
(2) Date: Jul. 22, 2014

(87) PCT Pub. No.: WO2013/111650
PCT Pub. Date: Aug. 1, 2013

(65) Prior Publication Data
US 2015/0005130 A1    Jan. 1, 2015

(30) Foreign Application Priority Data

Jan. 23, 2012    (JP) .................. 2012-011068

(51) Int. Cl.
*F16H 1/32* (2006.01)
*H02K 7/116* (2006.01)
(Continued)

(52) U.S. Cl.
CPC ............... *H02K 7/116* (2013.01); *B60K 1/00* (2013.01); *B60K 7/00* (2013.01); *B60K 7/0007* (2013.01);
(Continued)

(58) Field of Classification Search
CPC ... F16F 15/08; B60K 7/0007; B60K 17/046; B60K 17/043; B60K 2007/0038; B60K 2007/0092; B60K 2007/0061; F16H 2001/325; F16H 1/32; F16H 1/321
USPC .................... 475/178, 179; 180/372
See application file for complete search history.

(56) References Cited

U.S. PATENT DOCUMENTS 4,567,790 A * 2/1986 Butterfield .............. F16H 25/06
                                                  475/168
4,594,915 A * 6/1986 Braren .................... F16H 25/06
                                                  475/168
(Continued)

FOREIGN PATENT DOCUMENTS

EP    1 080 970    3/2001
JP    59-140985    9/1984
(Continued)

OTHER PUBLICATIONS

English translation of JP 2010071462A1; translationportal.epo.org; Feb. 23, 2016.*

(Continued)

*Primary Examiner* — Roger Pang
(74) *Attorney, Agent, or Firm* — Wenderoth, Lind & Ponack, L.L.P.

(57) ABSTRACT

A wheel driving device includes a speed reducer for transmitting rotation of an electric motor to a hub ring supporting a vehicle wheel after reducing its speed. The speed reducer is a cycloid speed reducer including an external gear, and an internal gear meshing with the external gear and rotationally fixed to the speed reducer casing through a rotational fixing arrangement which is also capable of elastically supporting the internal gear. The rotational fixing arrangement absorbs, by elastic deformation, vibration of the internal gear due to torque transmitted from the external gear to the internal gear, thereby preventing the vibration of the internal gear from being transmitted to the speed reducer casing.

19 Claims, 15 Drawing Sheets

(51) Int. Cl.
*F16F 15/08* (2006.01)
*B60K 1/00* (2006.01)
*B60K 17/04* (2006.01)
*B60K 7/00* (2006.01)

(52) U.S. Cl.
CPC ............ *B60K 17/043* (2013.01); *F16F 15/08* (2013.01); *B60K 17/046* (2013.01); *B60K 2007/0038* (2013.01); *B60K 2007/0061* (2013.01); *B60K 2007/0092* (2013.01); *F16H 1/32* (2013.01); *F16H 1/321* (2013.01); *F16H 2001/325* (2013.01)

(56) References Cited

U.S. PATENT DOCUMENTS

| | | | | |
|---|---|---|---|---|
| 5,964,676 | A * | 10/1999 | Rennerfelt | F16H 1/321 475/163 |
| 6,595,893 | B1 * | 7/2003 | Takayama | B60K 17/046 192/69.91 |
| 8,857,546 | B2 * | 10/2014 | Yamamoto | B60K 7/0007 180/65.51 |
| 2011/0133541 | A1 | 6/2011 | Makino et al. | |
| 2012/0181848 | A1 * | 7/2012 | Makino | B60K 7/0007 301/6.5 |
| 2012/0217789 | A1 * | 8/2012 | Yamamoto | B60G 3/20 301/6.5 |
| 2012/0326573 | A1 | 12/2012 | Yamamoto et al. | |

FOREIGN PATENT DOCUMENTS

| | | | |
|---|---|---|---|
| JP | 61-096045 | 6/1986 | |
| JP | 63-065873 | 4/1988 | |
| JP | 4-80949 | 7/1992 | |
| JP | 11-334388 | 12/1999 | |
| JP | 2009-052630 | 3/2009 | |
| JP | 2010-071462 | 4/2010 | |
| JP | WO 2012011461 A1 * | 1/2012 | ........... B60K 7/0007 |
| WO | 2011/108329 | 9/2011 | |

OTHER PUBLICATIONS

European Search Report issued Mar. 26, 2015 in corresponding European Patent Application No. 13740855.5.
J.F. Shannon, "Types of Epicyclic Gears" (excerpt) Ed—Jan. 1, 1977, Marine Gearing (Marine Engineering Design and Installation Seties), Marine Media Management Ltd, UK, p. 79, XP009181026.
Office Action issued Jun. 23, 2015 in corresponding Japanese Patent Application No. 2013-196690 (with partial English translation).
International Search Report issued Apr. 9, 2013 in International (PCT) Application No. PCT/JP2013/050662.
Written Opinion of the International Searching Authority issued Apr. 9, 2013 in International (PCT) Application No. PCT/JP2013/050662 (with English translation).

* cited by examiner

WHEEL DRIVING DEVICE

TECHNICAL FIELD

This invention relates to a wheel driving device for driving a drive wheel of a vehicle.

BACKGROUND ART

Wheel driving devices include an electric motor as a driving source, and a speed reducer through which the rotation of the motor is transmitted to a drive wheel after reducing its speed to drive the drive wheel. There are two types of such wheel driving devices, an in-wheel motor type and an on-board type.

FIG. 1(*a*) shows wheel driving devices A of the in-wheel motor type, which directly drive the respective rear wheels 1 as drive wheels. FIG. 1(*b*) shows wheel driving devices A of the on-board type, which drive the respective rear wheels 1 through drive shafts 3 connected through joints 2 to the output shafts of the speed reducers (not shown) in the respective wheel driving devices A.

Compact design is required for both wheel driving devices of the in-wheel motor type and those of the on-board type. Also, it is required that such wheel driving devices be capable of transmitting large torque to the rear wheels 1 to drive the rear wheels.

In order to answer these requirements, the below-identified Patent document 1 proposes a wheel driving device in which a cycloid speed reducer is used as the speed reducer for transmitting the rotation of the electric motor after reducing its speed.

A cycloid speed reducer includes an input shaft rotationally driven by the electric motor, and curved contoured plates as external gears rotatably mounted on respective eccentric shaft portions provided on the input shaft. This speed reducer further includes an outer pin retaining member as an internal gear fitted in the radially inner surface of a speed reducer casing supported by the vehicle body so as to be arranged coaxial with the input shaft. The outer pin retaining member supports outer pins as internal teeth which mesh with external teeth formed on the outer peripheries of the curved contoured plates and having an epitrochoidal profile. With this arrangement, when the input shaft is rotated, the curved contoured plates are eccentrically pivoted, so that the rotation of the curved contoured plates about their axes is transmitted from the output shaft, which is arranged coaxial with the input shaft.

In such a cycloid speed reducer, since the curved contoured plates as the external gears are eccentrically pivoted, it is necessary to rotationally fix the outer pin retaining member as the internal gear to the speed reducer casing. For this purpose, in the wheel driving device disclosed in Patent document 1, keys are used, each of which is fitted both in a key groove formed the radially inner surface of the speed reducer casing and in a key groove formed in the radially outer surface of the outer pin retaining member as the internal gear external to rotationally fix the outer pin retaining member.

In the wheel driving device disclosed in JP Patent Publication 2009-52630A, an elastic member is disposed between the speed reducer casing and the outer pin retaining member. When large radial loads or moment loads are applied to the outer pin retaining member while the vehicle is turning or during hard acceleration or deceleration, the elastic member is elastically deformed and thus absorbs such radial and/or moment loads. Thus, damage to the various parts of the wheel driving device including the curved contoured plates, outer pins as the internal teeth, and a motion converter mechanism for converting the eccentric pivoting motion of the curved contour plates to the rotary motion of the output shaft is prevented.

While the outer pin retaining member as the internal gear is kept afloat relative to the radially inner surface of the speed reducer casing with a gap left therebetween, by the elastic member, the internal gear is rotationally fixed by the keys. Thus, when the outer pin retaining member is vibrated by torque applied from the external gear, the vibration is transmitted to the speed reducer casing through the keys, which could generate noise.

SUMMARY OF THE INVENTION

An object of the present invention is to provide a wheel driving device in which it is possible to prevent vibration of the internal gear due to torque transmitted to the internal gear from being transmitted to the speed reducer casing, and which is thus quiet.

In order to achieve this object, the present invention provides a wheel driving device comprising an electric motor having a rotor, a speed reducer, and a hub ring. The speed reducer is configured to transmit a rotation of the rotor to the hub ring after reducing a speed of the rotation, and the hub ring is configured to transmit the rotation transmitted from the speed reducer to a drive wheel. The speed reducer is a cycloid speed reducer comprising an input shaft driven by the electric motor and having an eccentric shaft portion, an external gear having external teeth on an outer periphery of the external gear and rotatably supported by the eccentric shaft portion, an internal gear mounted in and rotationally fixed to a speed reducer casing by a rotational fixing arrangement. The internal gear has internal teeth on an inner periphery of the internal gear which mesh with the external teeth of the external gear and which are greater in number than the external teeth, and an output shaft is arranged coaxial with the input shaft. The speed reducer is configured such that when the input shaft rotates, the external gear is eccentrically pivoted and a rotation of the external gear about an axis of the eccentric gear is transmitted to the hub ring through the output shaft, and the rotational fixing arrangement is capable of elastically supporting the internal gear.

Since the rotational fixing arrangement is capable of elastically supporting the internal gear, the rotational fixing arrangement absorbs, by elastic deformation, vibration of the internal gear due to torque transmitted from the external gear, thus preventing transmission of vibration to the speed reducer casing.

When large radial loads or moment loads are applied to the internal gear while the vehicle is turning or during hard acceleration or deceleration, the rotational fixing arrangement is elastically deformed, thereby absorbing such radial and/or moment loads. This prevents damage to the various parts of the wheel driving device including the external gear and the internal gear.

The rotational fixing arrangement may comprise a plurality of bush fitting holes formed in one of the axially opposed surfaces of the speed reducer casing and the internal gear so as to be circumferentially spaced from each other, cylindrical elastically deformable elastic bushes fitted in the respective bush fitting holes, and support pins provided on the other of the two axially opposed surfaces so as to face, and be inserted in, the respective elastic bushes.

Alternatively, the rotational fixing arrangement may comprise an annular plate mounted to one of the axially opposed surfaces of the speed reducer casing and the internal gear, and formed with a plurality of circumferentially spaced apart bush fitting holes, cylindrical elastically deformable elastic bushes fitted in the respective bush fitting holes, and support pins provided on the other of the axially opposed surfaces so as to face and be inserted in the respective elastic bushes.

In either of the above rotational fixing arrangement, at least either the elastic bushes or the support pins are preferably fitted with a clearance fit in the bush fitting holes or the elastic bushes so that the elastic bushes can be easily mounted in position and/or the support pins can be easily inserted into the elastic bushes.

The elastic bushes may be rubber bushes each comprising two metal rings having different diameters from each other and bonded together by vulcanizing a rubber material disposed between the two metal rings. Such rubber bushes are less likely to be damaged and thus durable.

The rubber material is preferably an oil-resistant rubber material. Such oil-resistant rubber materials include nitrile rubbers, hydrogenated nitrile rubbers, acrylic rubbers and fluororubbers.

The rotational fixing arrangement according to the present invention, which is also capable of elastically supporting the internal gear, is not limited to those disclosed above. For example, the rotational fixing arrangement according to the present invention may be an annular shock-absorbing body comprising a large-diameter cylindrical member fitted in the radially inner surface of the speed reducer casing, a small-diameter cylindrical member fixedly fitted on the radially outer surface of the internal gear, and an elastic member disposed between radially opposed surfaces of the large-diameter cylindrical member and the small-diameter cylindrical member. The large-diameter cylindrical member and the small-diameter cylindrical member are fixedly coupled together through the elastic member, and wherein a recess is formed in one of the fitting surfaces of the large-diameter cylindrical member and the speed reducer casing. A protrusion is formed on the other of the fitting surfaces and engaged in the recess, thereby rotationally fixing the annular shock-absorbing body to the speed reducer casing.

The wheel driving device according to the present invention may be of the in-wheel motor type, in which the hub ring is directly rotated by the output shaft, or may be of the on-board type, in which the output shaft of the speed reducer is connected to a drive shaft, and the hub ring is connected to the drive shaft so that the hub ring is rotated by the drive shaft.

The hub ring is preferably fitted on the output shaft by splines so as to be rotationally fixed but axially slidable relative to the output shaft. With this arrangement, since the splines allow relative axial movement between the output shaft and the hub ring. Thus, the splines additionally reduce axial vibrations, thereby more effectively reducing noise.

The splines may be replaced with a ball spline. The ball spline allows smoother relative axial movement between the output shaft and the hub ring, thus further effectively reducing axial vibrations.

The surfaces fitted together by the splines are preferably coated with a sliding material such as a fluororesin to improve sliding properties, thus further effectively reducing noise.

Advantages of the Invention

In the wheel driving device according to the present invention, since the rotational fixing arrangement, which rotationally fixes the internal gear to the speed reducer casing, is also capable of elastically supporting the internal gear, the rotational fixing arrangement absorbs, by elastic deformation, vibrations generated in the speed reducer, thereby providing a quieter wheel driving device.

DETAILED DESCRIPTION OF THE INVENTION

Figure 2:
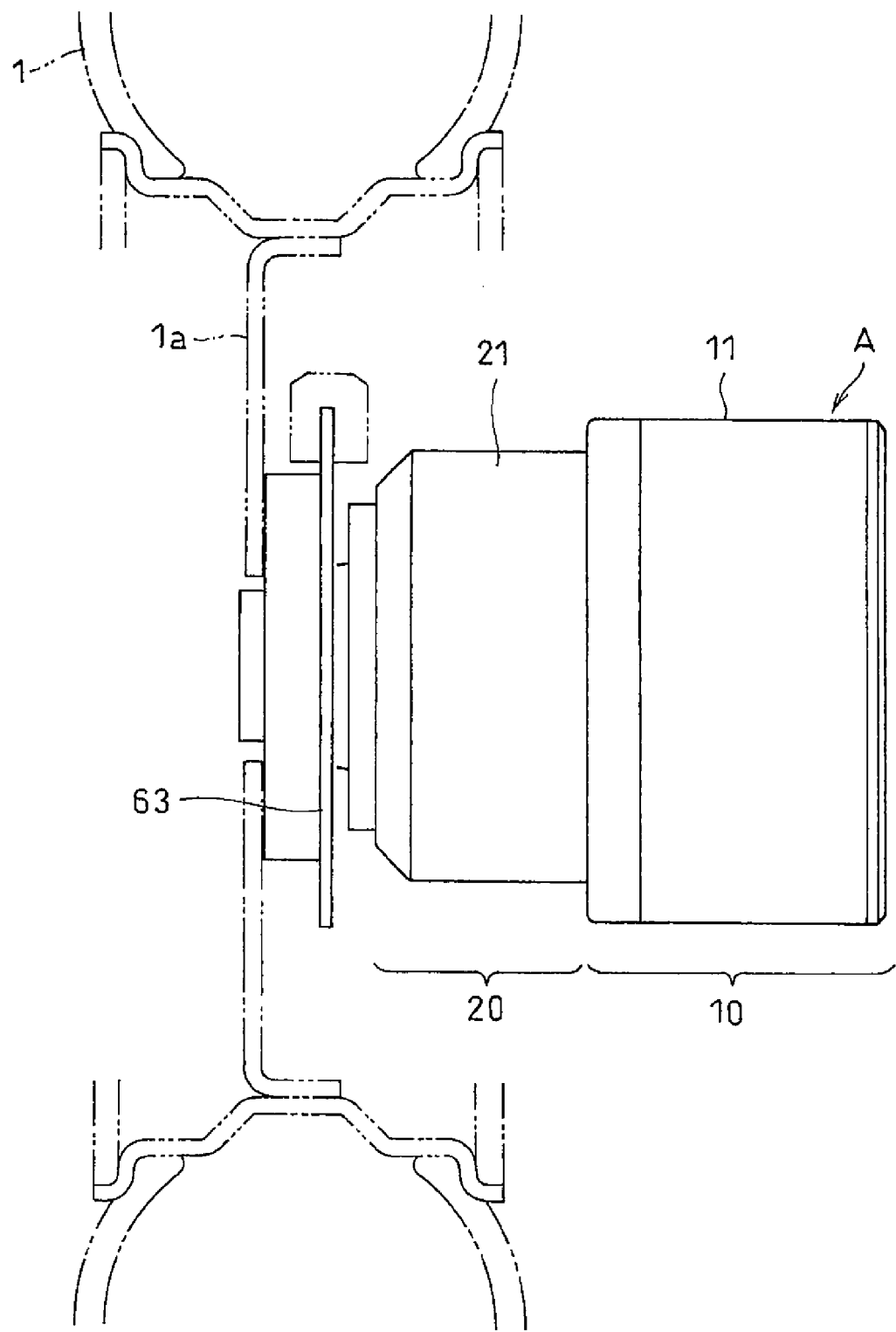
FIG. 2 is a front view of a wheel driving device embodying the present invention.

The embodiment of the present invention is now described with reference to the drawings. As shown in FIG. 2, a wheel driving device A according to the present invention is mounted in the wheel body 1a of a rear wheel 1 as a drive wheel of a vehicle.

Figure 3:
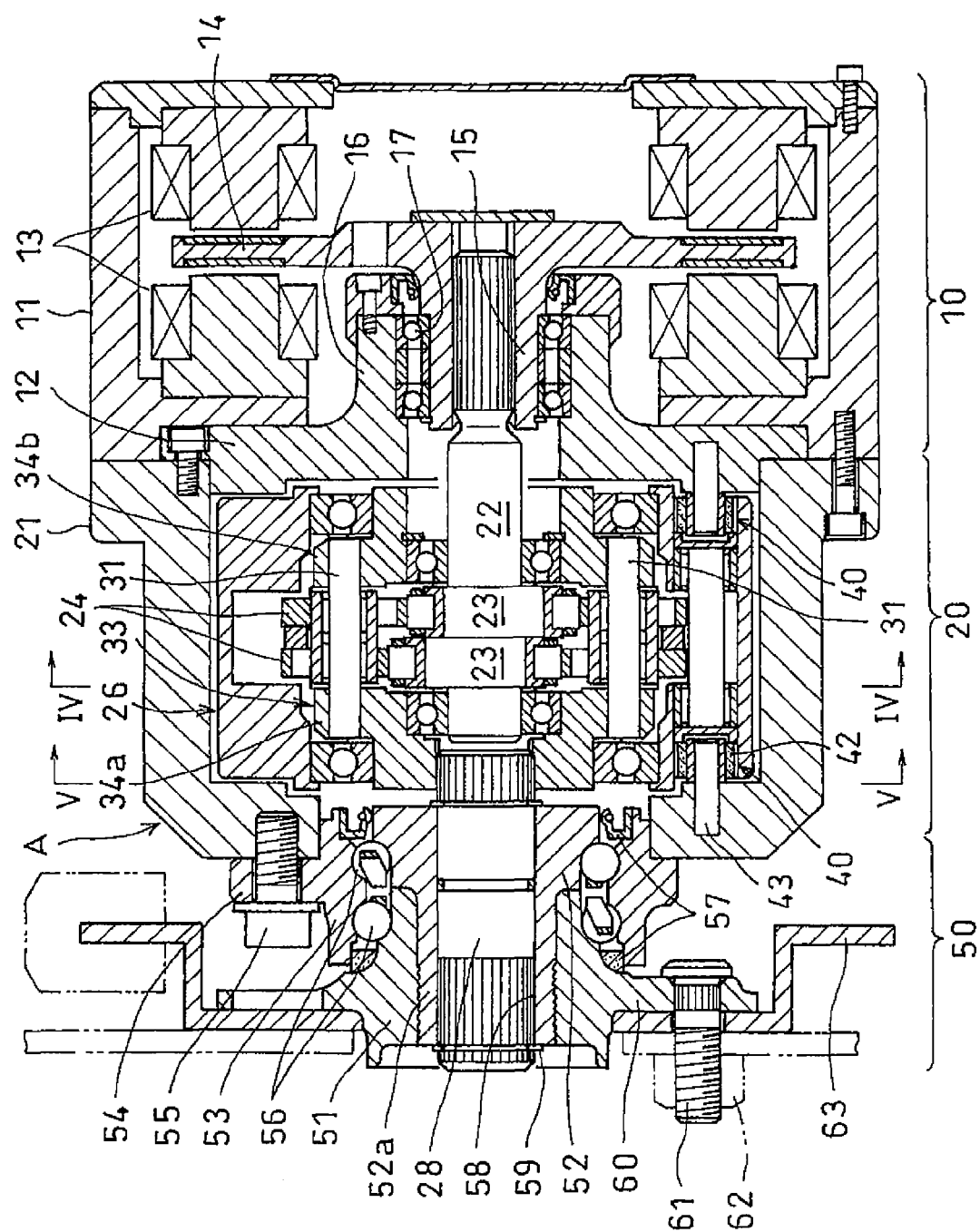
FIG. 3 is a vertical sectional view of the wheel driving device shown in FIG. 2.

As shown in FIG. 3, the wheel driving device A includes an electric motor 10, and a speed reducer 20 which reduces the rotation of the electric motor 10 and transmits the thus reduced rotation to the rear wheel 1. The wheel driving device A further includes a wheel bearing portion rotatably supporting the rear wheel 1. The electric motor 10 and the speed reducer 20 are mounted in respective casings 11 and 21 which are axially connected together. A partition wall 12 is provided at the portion where the casings 11 and 21 are connected together.

The electric motor 10 is an axial gap type motor, and includes a pair of stators 13 mounted in the motor casing 11 so as to axially face each other while being axially spaced from each other, with a rotor 14 disposed in the axial gap between the stators 13.

The rotor 14 has at its center a boss portion 15 inserted in a tubular portion 16 of the partition wall 12 formed at its center, and rotatably supported by bearings 17 mounted in the tubular portion 16.

Figure 4:
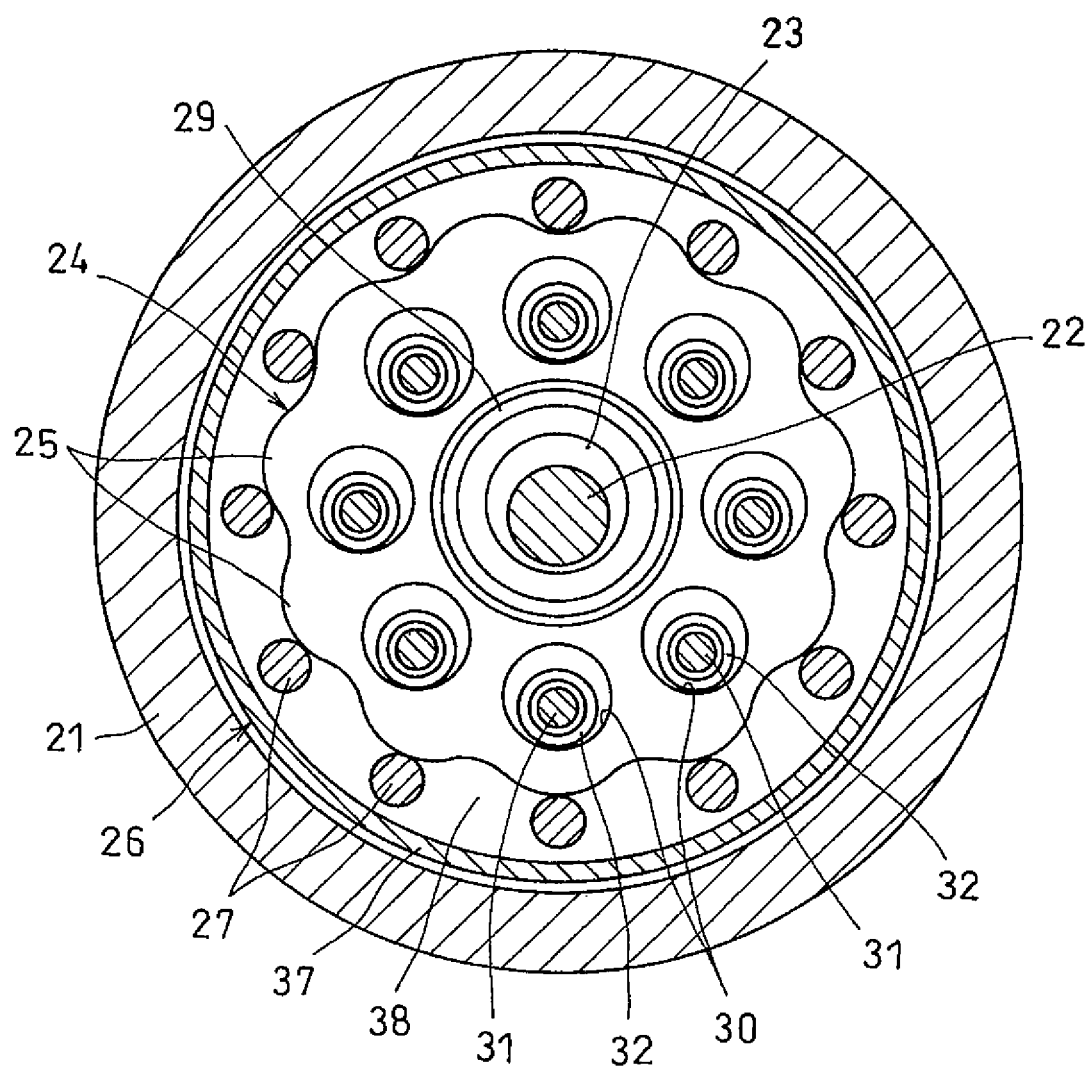
FIG. 4 is a sectional view taken along line IV-IV of FIG. 3.
Figure 6:
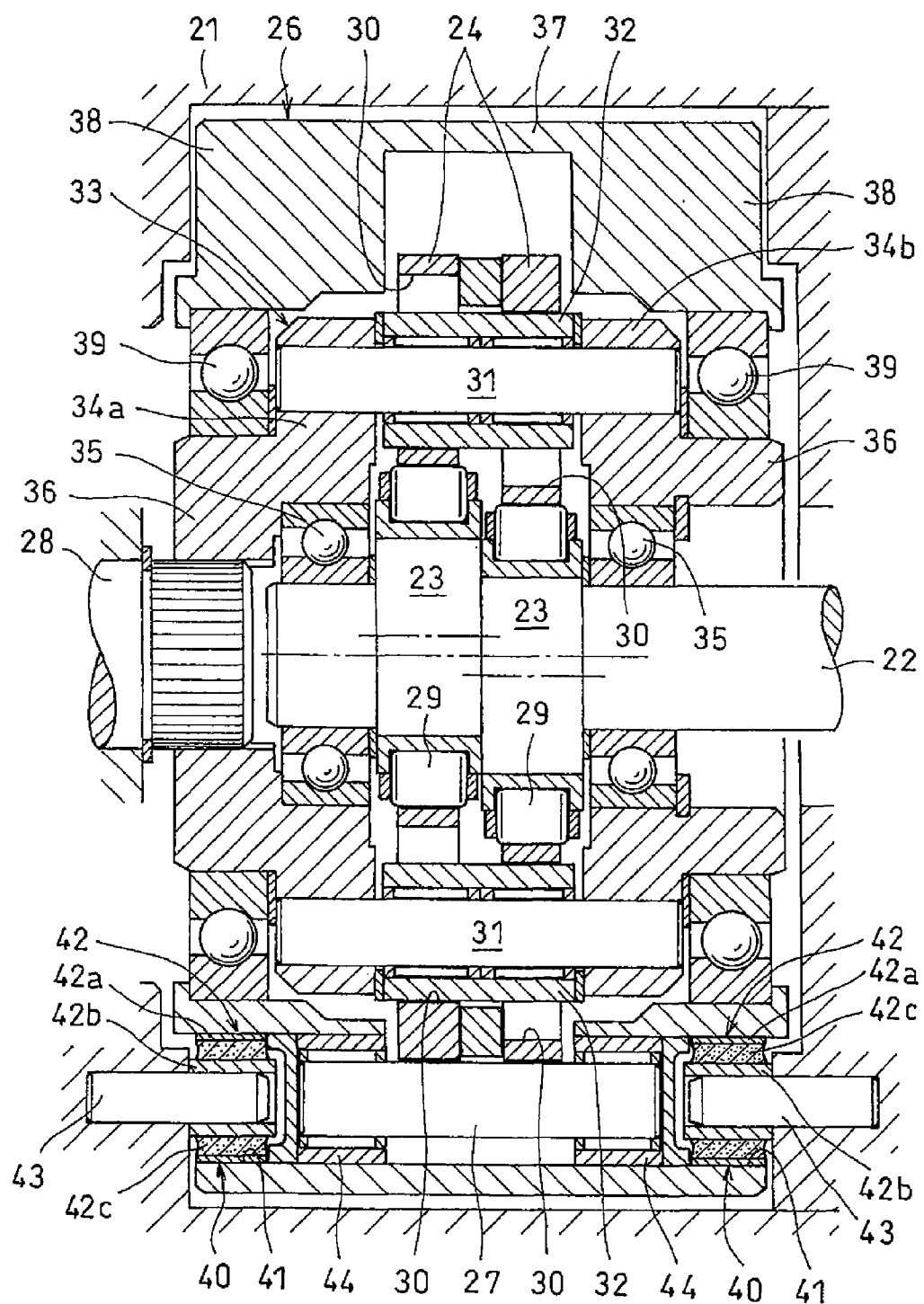
FIG. 6 is an enlarged sectional view of a cycloid speed reducer mechanism of FIG. 3.

As shown in FIGS. 3, 4 and 6, the speed reducer 20 is a cycloid speed reducer, and includes two eccentric shaft portions 23 of an input shaft 22, and external gears 24 rotatably supported by the respective eccentric shaft portions 23. The external gears 24 have external teeth 25 on the outer peripheries thereof which are in meshing engagement with internal teeth 27 of an internal gear 26 mounted in the speed reducer casing 21. With this arrangement, when the input shaft 22 is rotated, the external gears 24 are eccentrically pivoted such that the rotation of the external gears 24 about their respective center axes is transmitted to an output shaft 28 which is arranged coaxial with the input shaft 22.

The input shaft 22 has one end thereof connected to the boss portion 15 of the rotor 14 by splines so as to be driven by the electric motor 10. The eccentric shaft portions 23 are provided at the other end portion of the input shaft 22.

As shown in FIG. 6, the two eccentric shaft portions 23 are arranged in the axial direction of the input shaft 22 such that their centers are circumferentially offset from each other by 180°. Bearings 29 are fitted on the radially outer surfaces of the respective eccentric shaft portions 23.

As shown in FIG. 4, the external gears 24 are rotatably supported by the respective bearings 29. The external teeth 25 of the external gears 24, which are formed on the outer peripheries of the external gears 24, have a trochoidal tooth profile. Each external gear 24 is formed with a plurality of pin holes 30 arranged on a circumference whose center lies on the rotation axis of the external gear 24 so as to be equidistantly spaced apart from each other and axially aligned with the respective pin holes 30 of the other external gear 24. Inner pins 31 are inserted, with, through the respective axially aligned pairs of pin holes 30 such that rollers 32 rotatably supported on the respective inner pins 31 are each always in contact at a portion of its outer periphery with portions of the inner walls of the corresponding pin holes 30.

As shown in FIG. 6, the rollers 32 are needle roller bearings. The rollers 32 allow the external gears 24 to be eccentrically pivoted. While the external gears 24 are eccentrically pivoted, the rotation of the external gears 24 about their respective center axes is transmitted to a pin holder 33 supporting both ends of the inner pins 31 and then to the output shaft 28, which is connected to the pin holder 33.

The pin holder 33 includes a pair of axially opposed annular plates 34a and 34b supporting the respective ends of the inner pins 31. The annular plates 34a and 34b are rotatably supported by respective bearings 35 mounted on the radially outer surface of the input shaft 22.

The annular plates 34a and 34b have tubular portions 36 on the outer side surfaces thereof. The output shaft 28 has its end connected to the tubular portion 36 of the annular plate 34a, which is provided on the outboard side, i.e. provided nearer to the end of the input shaft 22, by means of splines.

As shown in FIGS. 4 and 6, the internal teeth 27 formed on the inner periphery of the internal gear 26 are in the form of outer pins and have a circular arc-shaped tooth profile. The internal teeth 27 are larger in number than the external teeth 25 of each external gear 24. The internal gear 26 includes a cylindrical portion 37 and two flanges 38 inwardly extending from the respective ends of the cylindrical portion 37 and rotatably supporting the respective ends of the internal teeth 27 or outer pins.

The internal gear 26 is rotatably supported by bearings 39 fitted on the radially outer surfaces of the tubular portions 36 of the respective annular plates 34a and 34b of the pin holder 33 so as to be kept afloat relative to, i.e. spaced from, the radially inner surface of the speed reducer casing 21. However, the internal gear 26 is rotationally fixed to the speed reducer casing 21 by rotational fixing means 40 elastically supporting the internal gear 26.

Figure 5:
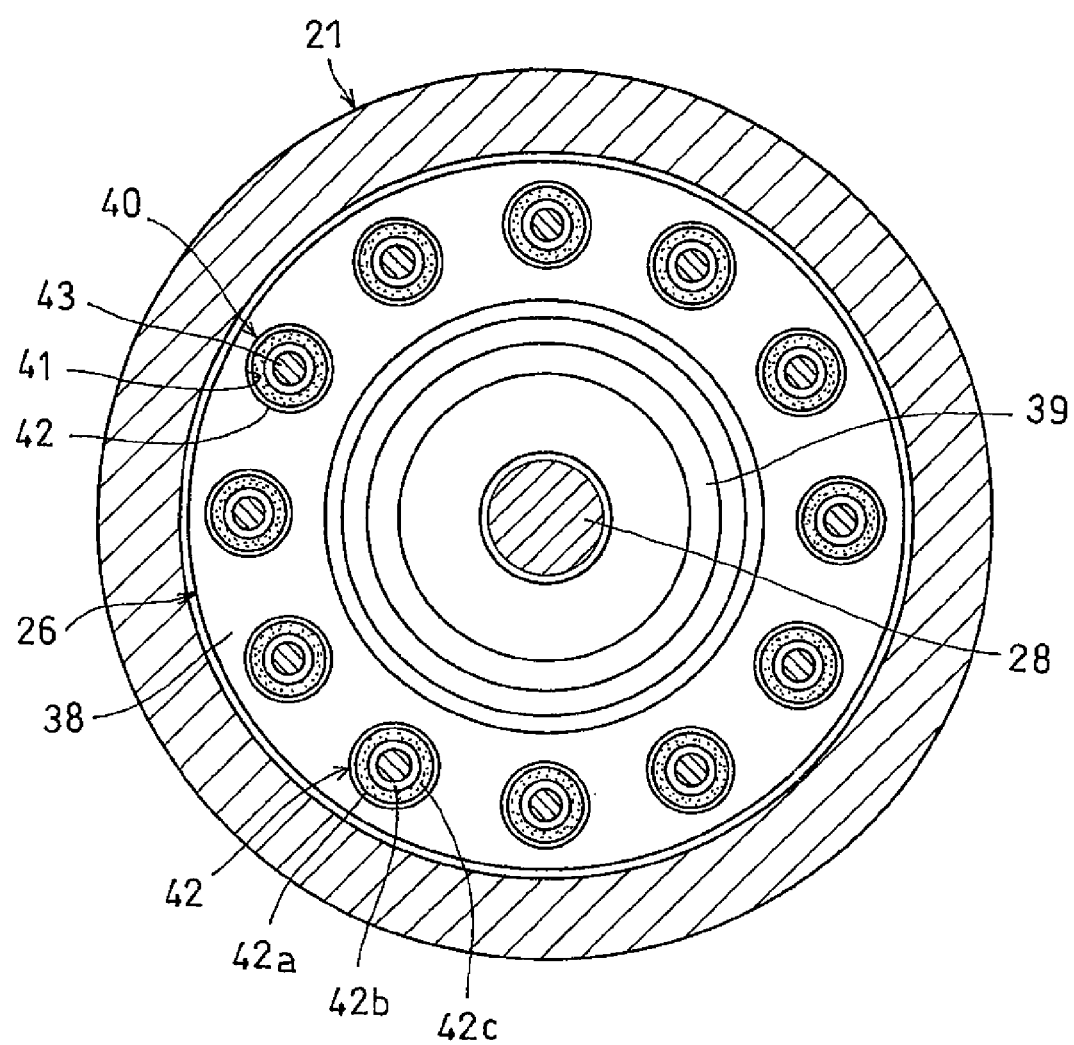
FIG. 5 is a sectional view taken along line V-V of FIG. 3.
Figure 7:
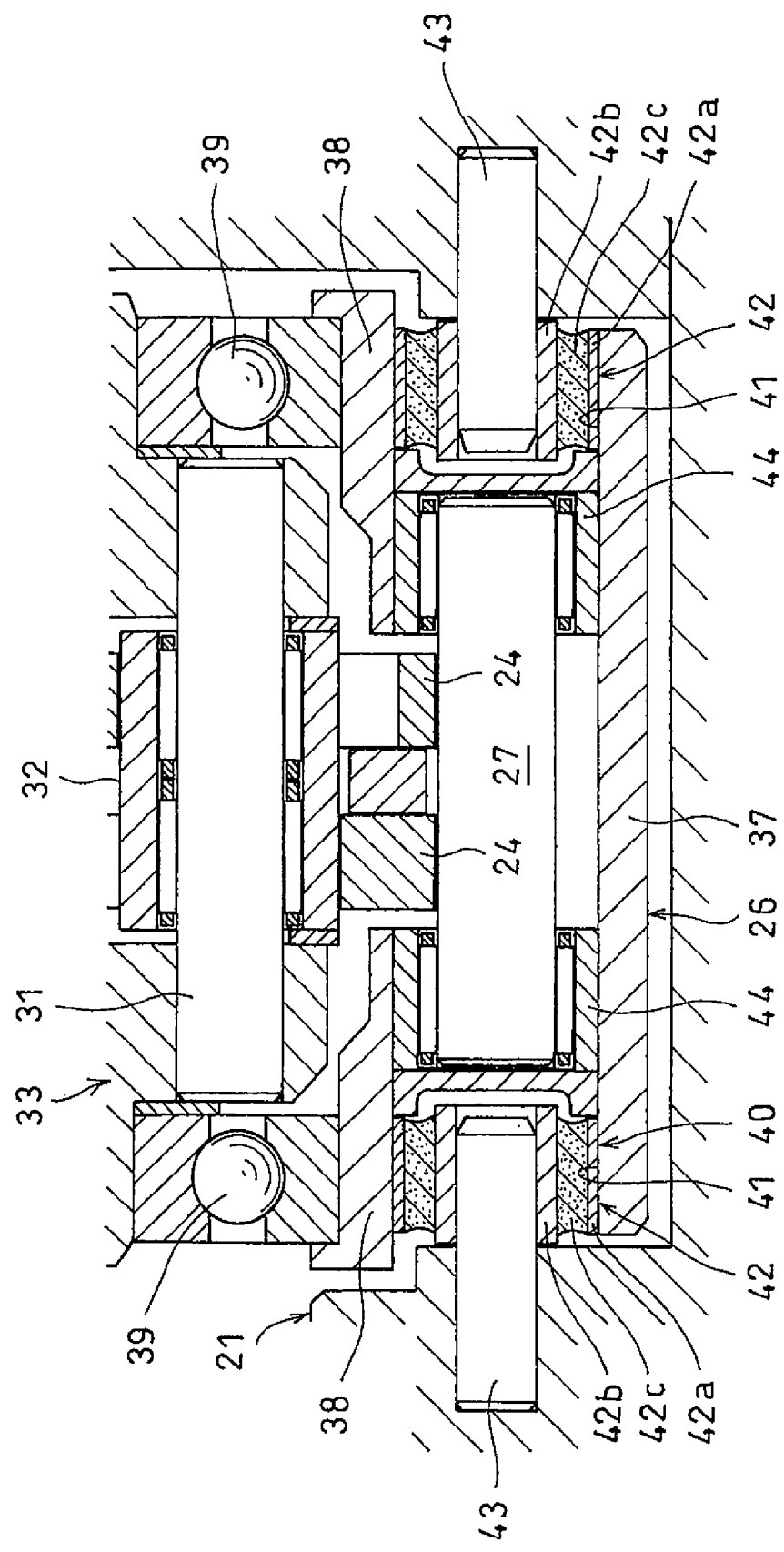
FIG. 7 is an enlarged sectional view of and around a rotational fixing arrangement capable of elastically supporting the internal gear, of FIG. 6.

As shown in FIGS. 5 to 7, the rotational fixing arrangement 40 includes a plurality of bush fitting holes 41 formed in the flanges 38 of the internal gear 26 so as to be coaxial with the respective internal teeth 27 or outer pins, and elastically deformable cylindrical elastic bushes 42 fitted in the respective bush fitting holes 41. The rotational fixing arrangement 40 further includes support pins 43 formed on the end surfaces of the speed reducer casing 21 axially facing the respective flanges 38, so as to face and be inserted in the respective elastic bushes 42.

The elastic bushes 42 are rubber bushes each including a pair of metal rings 42a and 42b different in diameter from each other and bonded together by vulcanizing a rubber member 42c disposed therebetween. The large-diameter metal ring 42a is fitted with a clearance fit in the bush fitting hole 41. The support pins 43 are also fitted with a clearance fit in the respective elastic bushes 42.

The rubber members 42c are preferably made of a sufficiently heat-resistant and oil-resistant rubber. Such rubbers include nitrile rubbers, hydrogenated nitrile rubbers, acrylic rubbers and fluororubbers.

In the embodiment, the elastic bushes 42 are fitted with a clearance fit in the respective bush fitting holes 41, and the support pins 43 are also fitted with a clearance fit in the elastic bushes 42. Alternatively, however, only either of the elastic bushes 42 and the support pins 43 may be fitted with a clearance fit, with the others fitted with an interference fit. Further alternatively, both the elastic bushes 42 and the support pins 43 may be fitted with an interference fit.

In the embodiment, the bush fitting holes 41 are arranged coaxial with the internal teeth 27 or outer pins, and the internal teeth 27 are rotatably supported by bearings 44 mounted in the respective bush fitting holes 41. Alternatively, however, the bush fitting holes 41 may be circumferentially offset from the respective internal teeth 27, while being circumferentially equidistantly spaced from each other.

As shown in FIG. 3, a wheel bearing portion 50 includes a hub ring 51 through which the rotation of the output shaft 28 of the speed reducer 20 is transmitted to the corresponding rear wheel 1. The bearing portion 50 further includes a bearing inner race 52 fixedly connected to the hub ring 51, and a bearing outer race 53 provided outside of the bearing inner race 52 and the hub ring 51.

The bearing outer race 53 has on its radially outer surface flanges 54 which are mounted to the speed reducer casing 21 by bringing the flanges 54 into abutment with an end surface of the speed reducer casing 21, threading bolts 55 into the end surface, and tightening the bolts 55.

The bearing inner race 52 includes a cylindrical portion 52a fitted in the radially inner surface of the hub ring 51. By caulking the cylindrical portion 52a radially outwardly from the radially inner surface of the cylindrical portion 52a, the bearing inner race 52 is fixedly joined to the hub ring 51. The thus fixedly joined bearing inner race 52 and hub ring 51 are rotatably supported by rolling elements 56 mounted between the bearing outer race 53 and the hub ring 51 and between the bearing outer race 53 and the bearing inner race 52. Seal members 57 are provided outside the rolling elements 56 to close openings of the bearing outer race 53 at both axial ends thereof.

The output shaft 28 is fitted in the radially inner surface of the bearing inner race 52 of the wheel bearing portion 50, while being rotationally fixed to the bearing inner race 52 by splines 58 formed on the fitting surfaces thereof. A snap ring 59 is mounted on the radially outer surface of the output shaft 28 to prevent the bearing inner race 52 from being pulled out of the output shaft 28.

The hub ring 51 has on its radially outer surface a wheel mounting flange 60 to which bolts 61 are mounted. A brake rotor 63 and the wheel body 1a of the rear wheel 1 are mounted on the wheel mounting flange 60 by threading nuts 62 onto the respective bolts 61 and tightening the nuts 62.

In the wheel driving device A of the embodiment, when the stators 13 of the electric motor 10 are energized, and the rotor 14 is rotated, the rotation of the rotor 14 is transmitted to the input shaft 22 of the speed reducer 20 via the boss portion 15, and the input shaft 22 rotates.

When the input shaft 22 rotates, the eccentric shaft portions 23 are eccentrically rotated. When the eccentric shaft portions 23 are eccentrically rotated, the external gears 24 are eccentrically pivoted, while rotating in the direction opposite to the rotational direction of the input shaft 22. This is because the external gears 24 are rotatably supported by the eccentric shaft portions 23; the external teeth 25 of the external gears 24, which are formed on the outer peripheries thereof, are in meshing engagement with the internal teeth 27 of the internal gear 26; and the external teeth 25 of each external gear 24 are fewer in number than the internal teeth 27 of the internal gear 26. The rotation of the external gears 24 is transmitted to the output shaft 28 through the inner pins 31 and the pin holder 33, so that the output shaft 28 is rotated at a reduced speed.

The rotation of the output shaft 28 is transmitted to the hub ring 51, and the rear wheel 1 supported by the hub ring 51 is driven or rotated.

If the internal gear 26 should be rotationally fixed to the speed reducer casing 21 by keys, vibration of the internal gear 26 due to torque applied from the external gears 24 while the rear wheel 1 is rotating would be transmitted to the speed reducer casing 21. This could generate noise.

In the above embodiment, however, the rotational fixing arrangement 40 absorbs vibration of the internal gear 26 due to torque applied from the external gears 24. In particular, because the bush fitting holes 41 are formed in the pair of flanges 38 of the internal gear 26, the elastically deformable cylindrical elastic bushes 42 are fitted in the respective bush fitting holes 41. The support pins 43 are supported by the speed reducer casing 21 and inserted in the respective elastic bushes 42, thereby rotationally fixing the internal gear 26, while vibration of the internal gear 26 is absorbed by elastic deformation of the elastic bushes 42. This prevents transmission of vibration to the speed reducer casing 21, which in turn prevents noise.

When large radial loads or moment loads are applied to the internal gear 26 while the vehicle is turning or during hard acceleration or deceleration of the vehicle, the elastic bushes 42 are elastically deformed, thus absorbing such radial loads or moment loads. This prevents possible damage to various component parts such as the external gears 24, internal gear 26 and inner pins 31.

In FIG. 3, an axial gap type electric motor is shown as the electric motor 10, but the electric motor 10 is not limited to this particular type. For example, as shown in FIG. 8, a radial gap type electric motor may be used, which includes a stator 13 mounted to the radially inner surface of the motor casing 11, and a rotor 14 provided inside of the stator 13.

In FIG. 6, the bush fitting holes 41 are formed in the internal gear 26 with the elastic bushes 42 fitted in the bush fitting holes 41, and the support pins 43 are supported by the speed reducer casing 21 and inserted in the respective elastic bushes 42. However, as shown in FIGS. 8 and 9, the bush fitting holes 41, in which the elastic bushes 42 are fitted, may be formed in the speed reducer casing 21, and the support pins 43 may be supported by the internal gear 26.

Figure 8:
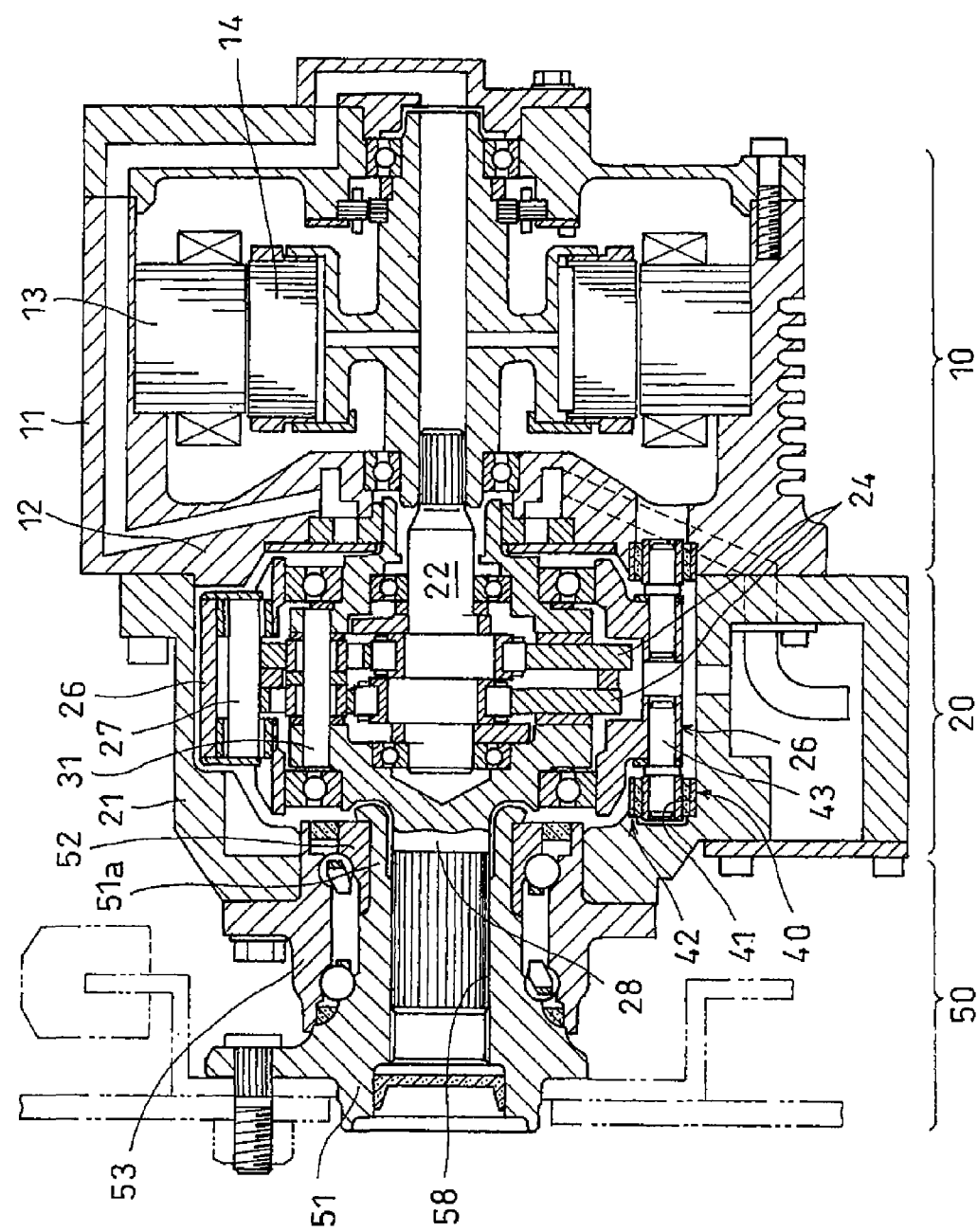
FIG. 8 is a vertical sectional view of a different wheel driving device according to the present invention.
Figure 9:
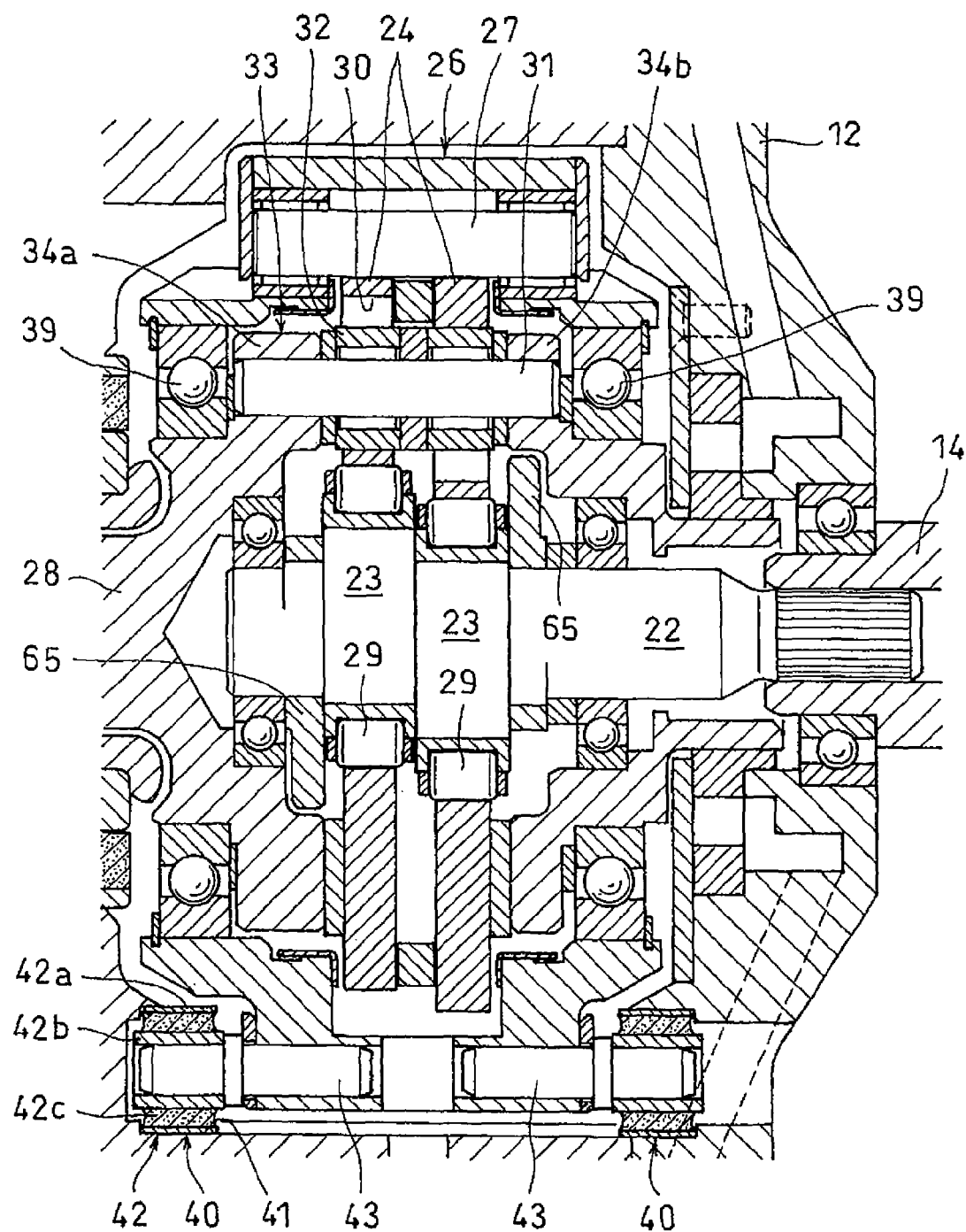
FIG. 9 is a partial enlarged sectional view of FIG. 8.

In FIGS. 8 and 9, the outboard annular plate 34a is an integral part of the output shaft 28. Counterweights 65 are mounted on the input shaft 22 on the outsides of the respective eccentric shaft portions 23 to improve the rotational balance of the input shaft 22.

Further in this embodiment, the hub ring 51 of the wheel bearing portion 50 has a small-diameter cylindrical portion 51a. The bearing inner race 52 is fixedly press-fitted on the radially outer surface of the small-diameter cylindrical portion 51a. The hub ring 51 is fitted on the output shaft 28 of the speed reducer 20 through splines 58 so as to be rotationally fixed to but axially slidable relative to the output shaft 28.

Since the splines 58 allow axial movement of the hub ring 51 relative to the output shaft 28, axial vibration can be additionally absorbed at the fitting portion where the hub ring and the output shaft are fitted together by the splines 58. This further reduces noise.

The fitting portion by the splines 58 may be provided with a coating of a sliding material such as a fluororesin to improve the sliding properties of the fitting portion and thus to further reduce noise.

Figure 14:
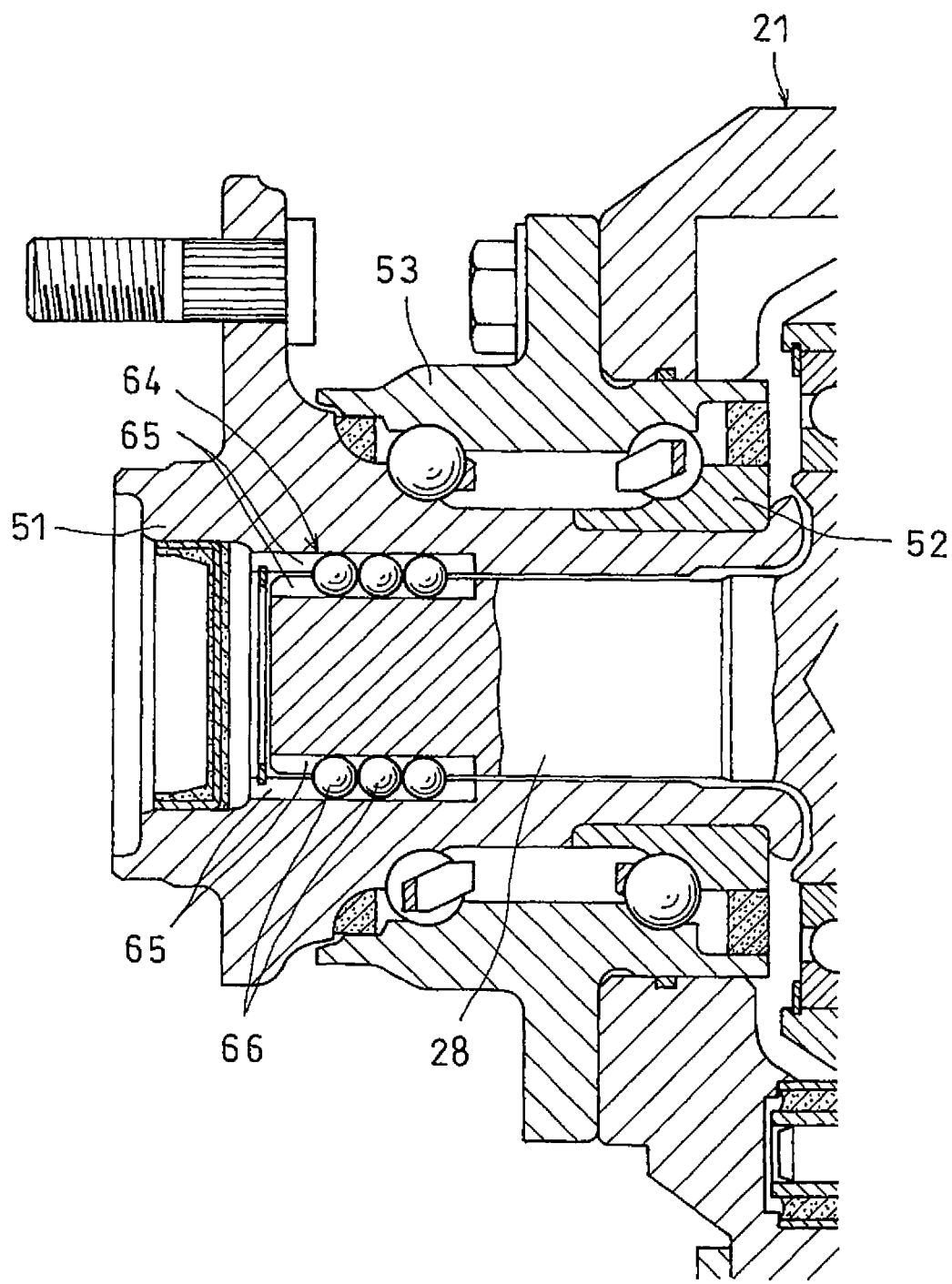
FIG. 14 is a sectional view showing different means for connecting the output shaft to the hub ring.

Instead of the splines 58, a ball spline 64 shown in FIG. 14 may be used. The ball spline 64 allows smoother axial sliding movement between the output shaft 28 and the hub ring 51, and thus more effectively absorbs axial vibration.

The ball spline 64 includes a plurality of first spline grooves 65 formed in the radially outer surface of the output shaft 28 so as to be circumferentially spaced from each other, and a plurality of second spline grooves 65 formed in the radially inner surface of the hub ring 51 so as to be radially face the respective first spline grooves 65. The ball spline 64 further includes a plurality of balls 66 disposed between each radially opposed pair of spline grooves 65 so as to be rollable therein.

FIGS. 10 to 13 show different rotationally fixing means 40. The rotationally fixing means 40 shown in FIGS. 10, 11(c) and 11(d) has first and second portions on the right and left sides of the internal gear 26, respectively. The first portion comprises, like the rotational fixing arrangement 40 shown in FIGS. 8 and 9, elastic bushes 42 and support pins 43.

The second portion, i.e. the portion on the left side of the internal gear 26, of the rotationally fixing means 40 includes an annular plate 70 mounted to an inner surface of an end plate of the speed reducer casing 21 and formed with a plurality of circumferentially spaced apart bush fitting holes 71. The second portion further includes elastically deformable cylindrical elastic bushes 72 fitted in the respective bush fitting holes 71. The second portion still further includes support pins 73 mounted in the outer side surface of the internal gear 26 and inserted in the respective elastic bushes 72.

The elastic bushes 72 are rubber bushes each including a rubber member 72b disposed between and bonded by vulcanization to the radially outer surface of a metal ring 72a and the radially inner surface of the bush fitting hole 71. The annular plate 70 is fixedly mounted to the end plate of the speed reducer casing 21 by tightening bolts 75 inserted through bolt inserting holes 74 formed in the annular plate 70.

This rotational fixing arrangement 40 can also rotationally fix the internal gear 26 to the speed reducer casing 21, while elastically supporting the internal gear 26. In particular, the elastic bushes 72 absorb, by elastic deformation, vibration of the internal gear 26 when torque is applied to the internal gear 26 from the external gears 24.

Figure 10:
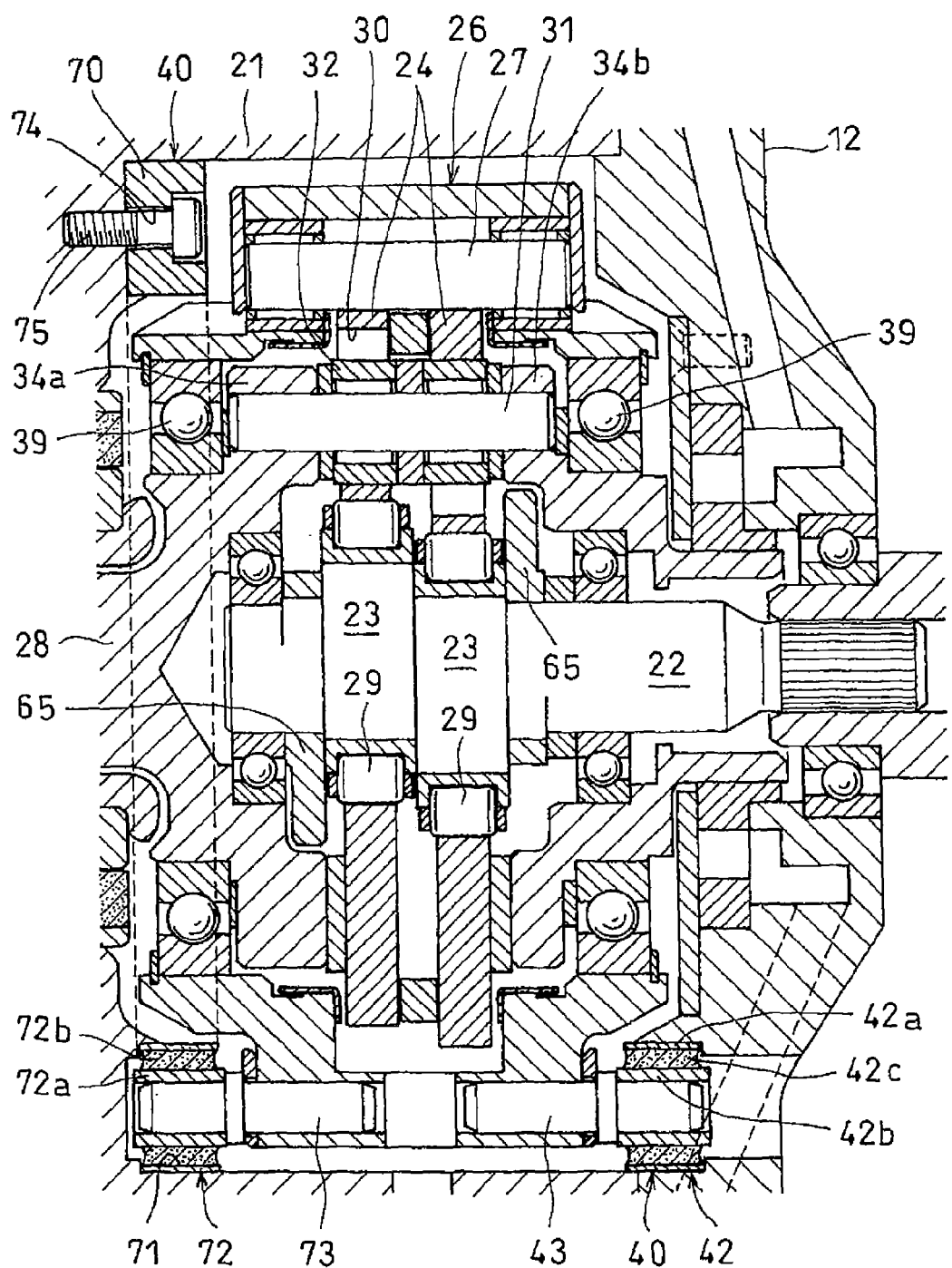
FIG. 10 is a sectional view of a different rotational fixing arrangement.
Figure 11:
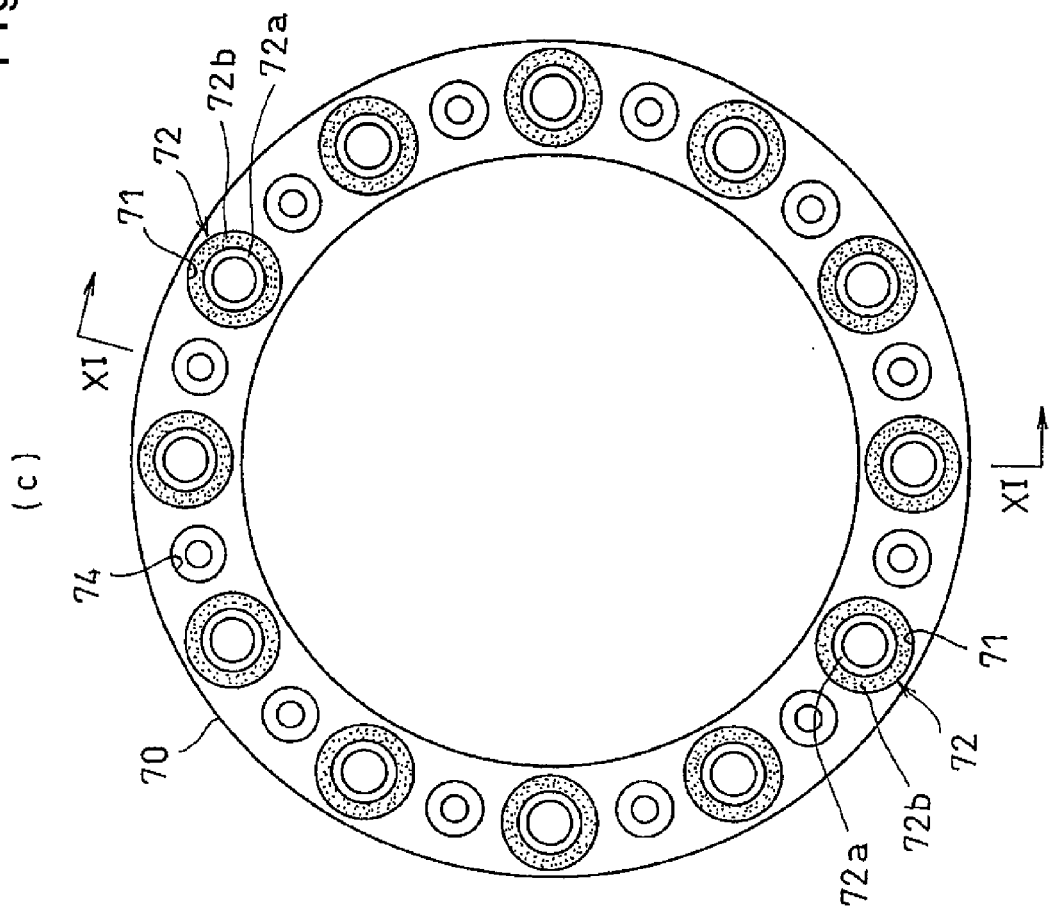
FIG. 11(c) is a front view of an annular plate shown in FIG. 10.
FIG. 11(d) is a sectional view taken along line XI-XI of FIG. 11(c).
Figure 11:
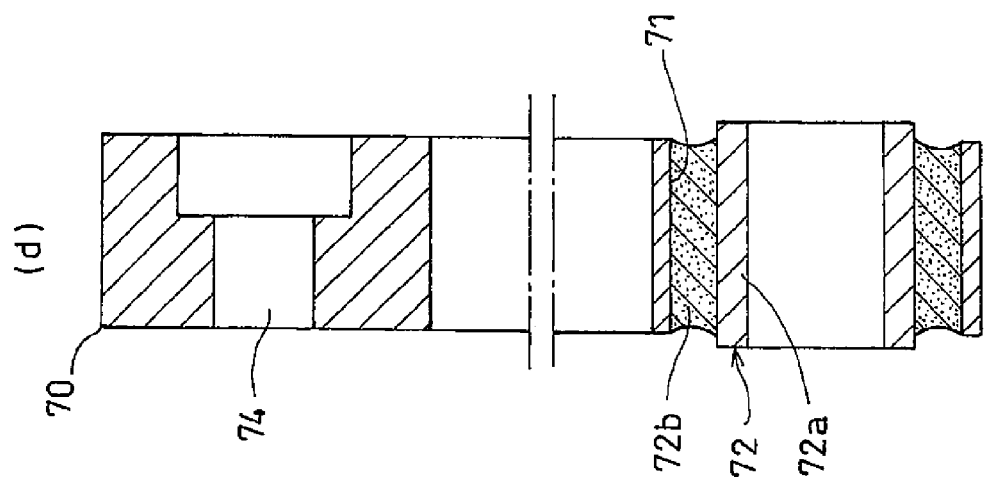

While in FIG. 10, the annular plate 70 is mounted to the end plate of the speed reducer casing 21, and the support pins 73 are supported by the internal gear 26, the annular plate 70 may be mounted to the internal gear 26, and the support pins 73 may be supported by the end plate of the speed reducer casing 21.

Figure 12:
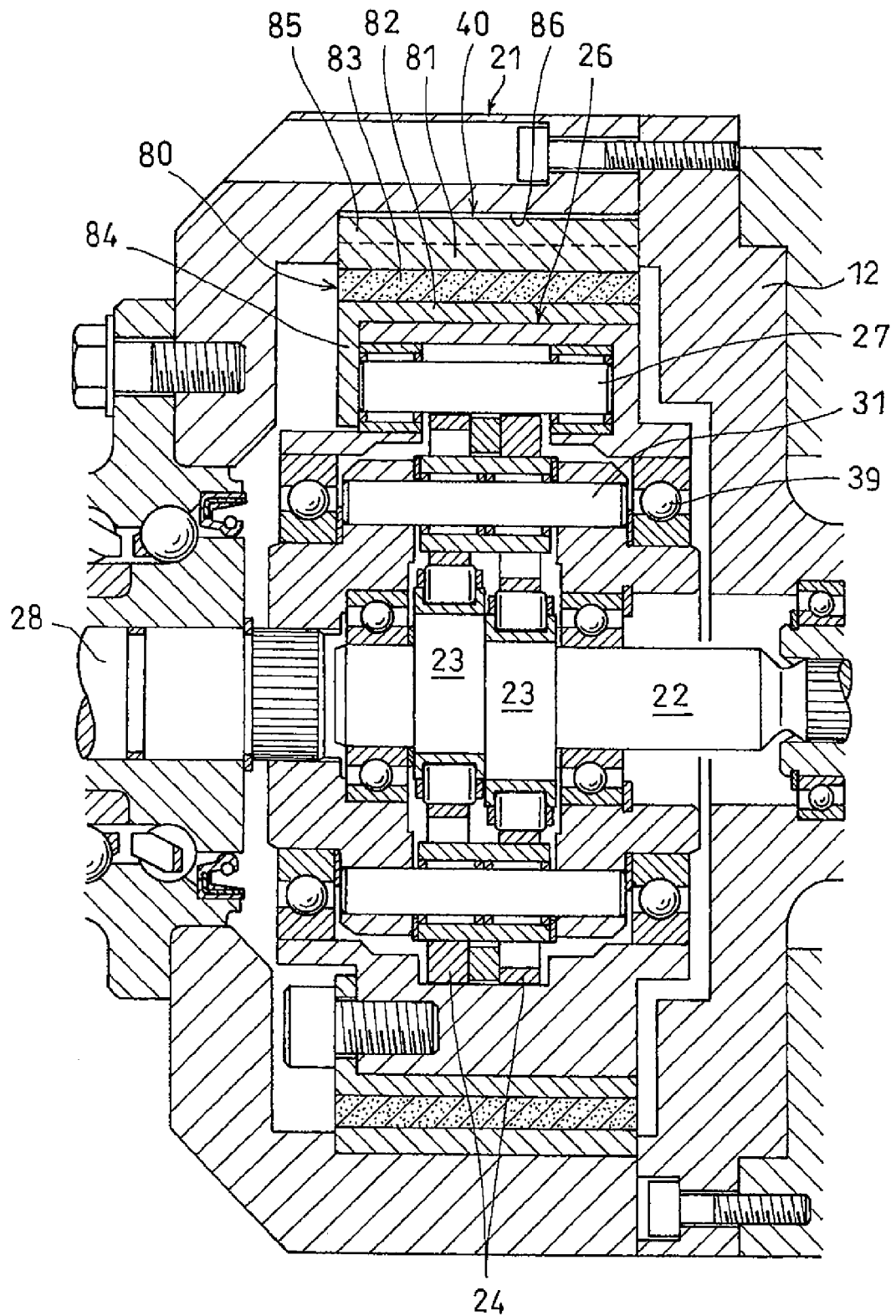
FIG. 12 is a sectional view of a further different rotationally fixing means.
Figure 13:
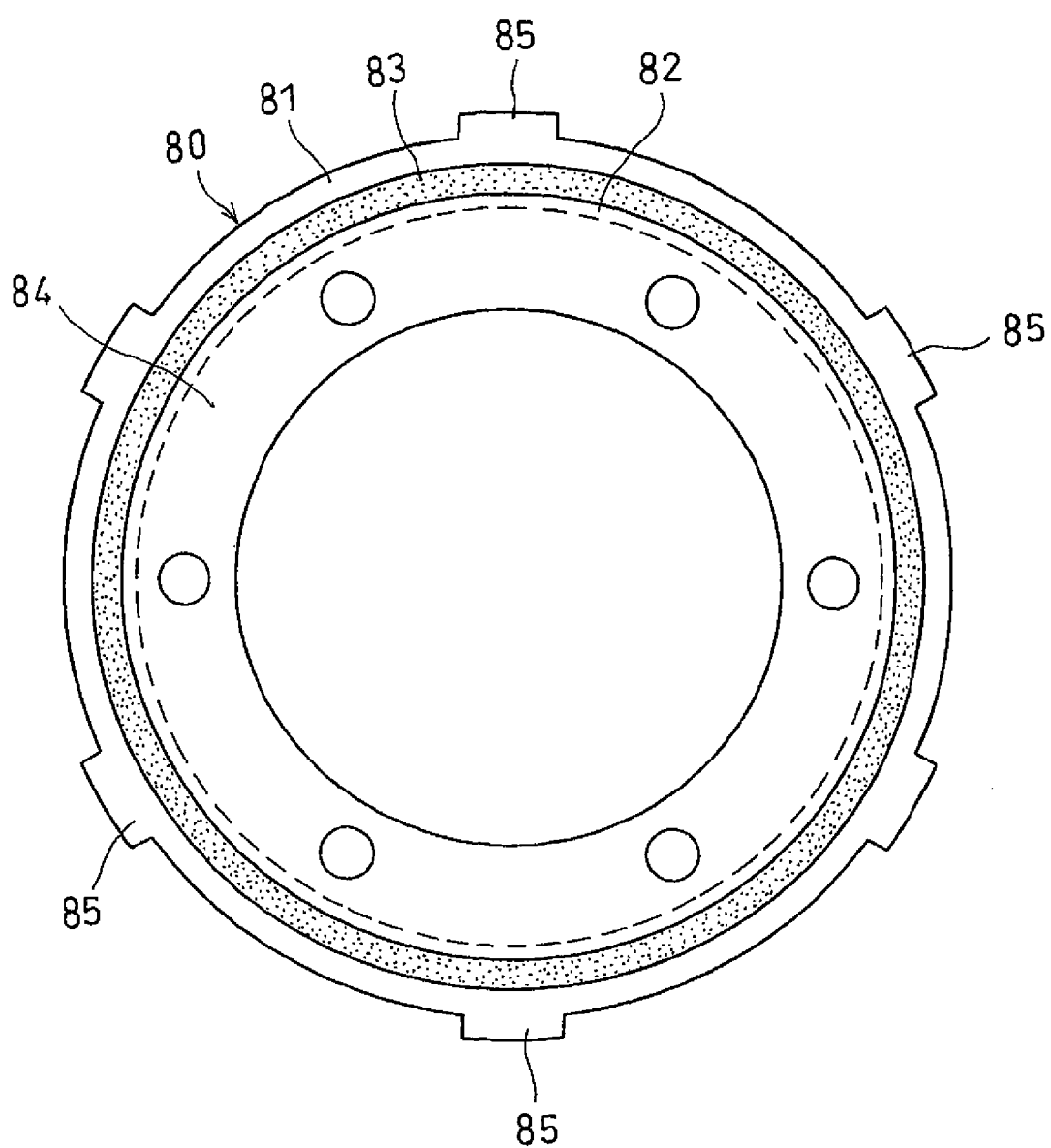
FIG. 13 is a front view of an annular shock-absorbing body shown in FIG. 12.

The rotational fixing arrangement 40 shown in FIGS. 12 and 13 is an annular shock-absorbing body 80 including a large-diameter cylindrical member 81 which can be fitted in the radially inner surface of the speed reducer casing 21, and a small-diameter cylindrical member 82 which can be fixedly fitted on the radially outer surface of the internal gear 26. The large-diameter cylindrical member 81 and the small-diameter cylindrical member 82 are fixedly coupled together through an elastic member 83 made of e.g. rubber and disposed between the radially opposed surfaces of the large-diameter and the small-diameter cylindrical members 81 and 82. The annular shock-absorbing body 80 is fitted between the radially inner surface of the speed reducer casing 21 and the radially outer surface of the internal gear 26, and rotationally fixed to the speed reducer casing 21 by bolting a flange 84 extending from one end edge of the small-diameter cylindrical member 82 to the internal gear 26, and by engaging a plurality of protrusions 85 formed on the radially outer surface of the large-diameter cylindrical member 81 in groove-shaped recesses 86 formed in the radially inner surface of the speed reducer casing 21.

This rotational fixing arrangement 40 can also rotationally fix the internal gear 26 to the speed reducer casing 21, while elastically supporting the internal gear 26. In particular, the elastic member 83 absorbs, by elastic deformation, vibration of the internal gear 26 when torque is applied to the internal gear 26 from the external gears 24.

As an alternative to the above arrangement, the groove-shaped recesses 86 may be formed in the radially outer surface of the large-diameter cylindrical member 81, while the protrusions 85 may be formed on the radially inner surface of the speed reducer casing 21.

Figure 1:
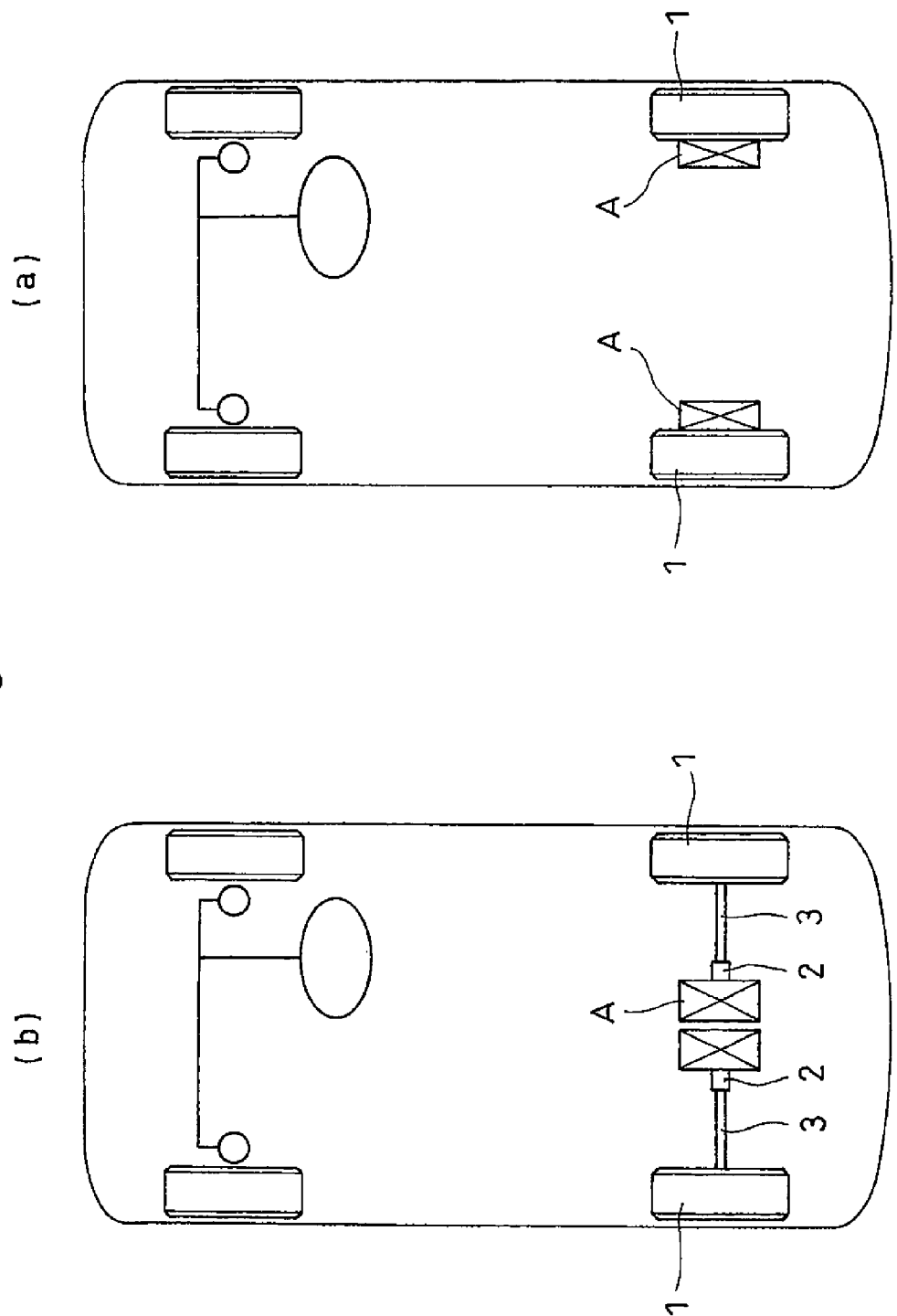
FIG. 1(a) schematically shows an electric vehicle carrying wheel driving devices of the in-wheel motor type according to the present invention.
FIG. 1(b) schematically shows an electric vehicle carrying wheel driving devices of the on-board type according to the present invention.
Figure 15:
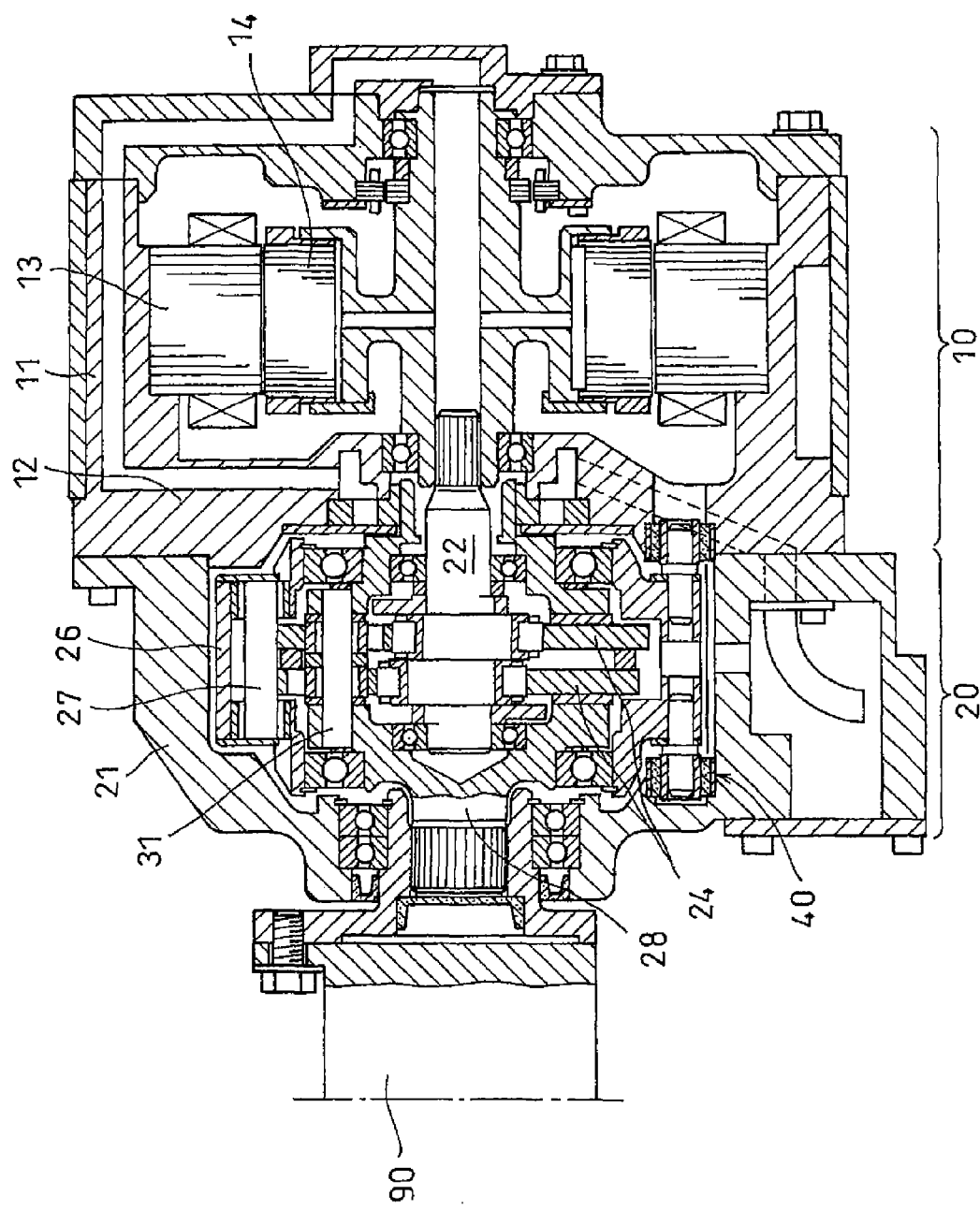
FIG. 15 is a wheel driving device of the on-board type according to the present invention.

The wheel driving device A shown in FIGS. 1 to 14 is of the in-wheel motor type, of which the hub ring 51 is mounted on and directly driven by the output shaft 28. However, the wheel driving device A according to the present invention may be of the on-board type as shown in FIG. 15, in which the drive shaft 3 shown in FIG. 1(b) is connected to the output shaft 28 of the speed reducer 20 through a joint 90, and the hub ring 51 shown in FIG. 3 is connected to the drive shaft 3 such that the hub ring 51 is driven by the drive shaft 3.

DESCRIPTION OF THE NUMERALS

1. Rear wheel (Drive wheel)
3. Drive shaft
10. Electric motor
14. Rotor
20. Speed reducer
21. Speed reducer casing
22. Input shaft
23. Eccentric shaft portion
24. External gear
25. External tooth
26. Internal gear
27. Internal tooth
28. Output shaft
40. Rotationally fixing means
41. Bush fitting hole
42. Elastic bush (rubber bush)
42a. Metal ring
42b. Metal ring
42c. Rubber
43. Support pin
70. Annular plate
71. Bush fitting hole
72. Elastic bush
73. Support pin
80. Annular shock-absorbing body
81. Large-diameter cylindrical member
82. Small-diameter cylindrical member
83. Elastic member
85. Protrusion
86. Recess

What is claimed is:

1. A wheel driving device comprising:
an electric motor having a rotor;
a speed reducer including inner pins and a pin holder supporting the inner pins; and
a hub ring, the speed reducer being configured to transmit a rotation of the rotor to the hub ring after reducing a speed of the rotation, and the hub ring is configured to transmit the rotation transmitted from the speed reducer to a drive wheel;
wherein the speed reducer is a cycloid speed reducer comprising:
an input shaft driven by the electric motor and having an eccentric shaft portion, the input shaft supporting the pin holder of the speed reducer so that the pin holder is rotatable about the input shaft;
an external gear having external teeth on an outer periphery of the external gear, the external gear having a plurality of pin holes arranged on a circle having a center on a rotational axis of the external gear, the pin holes being spaced apart equidistantly from each other, each of the inner pins of the speed reducer being inserted with play into a respective one of the pin holes of the external gear;
a bearing supported by the pin holder of the speed reducer;
an internal gear mounted in and rotationally fixed to a speed reducer casing by a rotational fixing arrangement, the internal gear being rotatably supported by the bearing, the internal gear having internal teeth on an inner periphery of the internal gear, and the internal teeth mesh with the external teeth of the external gear, a quantity of the internal teeth being greater than a quantity of the external teeth; and
an output shaft arranged coaxial with the input shaft and connected to the pin holder of the speed reducer, the external gear being rotatably supported by the eccentric shaft portion such that a rotation of the external gear about a rotational axis of the eccentric shaft portion is transmitted to the output shaft via the inner pins and the pin holder of the speed reducer,
wherein the speed reducer is configured such that when the input shaft rotates, the external gear is eccentrically pivoted and a rotation of the external gear about an axis of the eccentric gear is transmitted to the hub ring through the output shaft, and wherein the rotational fixing arrangement is capable of elastically supporting the internal gear.

2. The wheel driving device of claim 1, wherein the rotational fixing arrangement comprises a plurality of bush fitting holes formed in one of two axially opposed surfaces of the speed reducer casing and the internal gear, respectively, so as to be circumferentially spaced from each other, cylindrical elastically deformable elastic bushes fitted in the respective bush fitting holes, and support pins provided on the other of the two axially opposed surfaces so as to face and be inserted in the respective elastic bushes.

3. The wheel driving device of claim 1, wherein the rotational fixing arrangement comprises an annular plate mounted to one of two axially opposed surfaces of the speed reducer casing and the internal gear, respectively, and formed with a plurality of circumferentially spaced apart bush fitting holes, cylindrical elastically deformable elastic bushes fitted in the respective bush fitting holes, and support pins provided on the other of the two axially opposed surfaces so as to face and be inserted in the respective elastic bushes.

4. The wheel driving device of claim 2, wherein at least either the elastic bushes or the support pins are fitted with a clearance fit in the bush fitting holes or the elastic bushes.

5. The wheel driving device of claim 2, wherein the elastic bushes are rubber bushes each comprising two metal rings having different diameters from each other and bonded together by a vulcanized rubber material disposed between the two metal rings.

6. The wheel driving device of claim 5, wherein the rubber material is an oil-resistant rubber material.

7. The wheel driving device of claim 6, wherein the oil-resistant rubber material is one of nitrile rubber, hydrogenated nitrile rubber, acrylic rubber and fluororubber.

8. The wheel driving device of claim 1, wherein the rotational fixing arrangement is an annular shock-absorbing body comprising a large-diameter cylindrical member fitted in a radially inner surface of the speed reducer casing, a small-diameter cylindrical member fixedly fitted on a radially outer surface of the internal gear, and an elastic member disposed between radially opposed surfaces of the large-diameter cylindrical member and the small-diameter cylindrical member, wherein the large-diameter cylindrical member and the small-diameter cylindrical member are fixedly coupled together through the elastic member, and wherein a recess is formed in one of two fitting surfaces of the large-diameter cylindrical member and the speed reducer casing, respectively, and a protrusion is formed on the other of the two fitting surfaces and engaged in the recess, thereby rotationally fixing the annular shock-absorbing body to the speed reducer casing.

9. The wheel driving device of claim 1, wherein the wheel driving device is an in-wheel motor type wheel driving device, wherein the hub ring is mounted on the output shaft of the speed reducer such that the hub ring is rotated by the output shaft.

10. The wheel driving device of claim 1, wherein the hub ring is fitted on the output shaft by splines so as to be rotationally fixed but axially slidable relative to the output shaft.

11. The wheel driving device of claim 1, wherein the hub ring is fitted on the output shaft by a ball spline so as to be rotationally fixed but axially slidable relative to the output shaft.

12. The wheel driving device of claim 1, wherein the wheel driving device is an on-board type wheel driving device, wherein the output shaft of the speed reducer is connected to a drive shaft, and the hub ring is connected to the drive shaft so that the hub ring is rotated by the drive shaft.

13. The wheel driving device of claim 3, wherein at least either the elastic bushes or the support pins are fitted with a clearance fit in the bush fitting holes or the elastic bushes.

14. The wheel driving device of claim 3, wherein the elastic bushes are rubber bushes each comprising two metal rings having different diameters from each other and bonded together by a vulcanized rubber material disposed between the two metal rings.

15. The wheel driving device of claim 3, which is an in-wheel motor wheel driving device, wherein the hub ring is mounted on the output shaft of the speed reducer such that the hub ring is rotated by the output shaft.

16. The wheel driving device of claim 3, wherein the hub ring is fitted on the output shaft by splines so as to be rotationally fixed but axially slidable relative to the output shaft.

17. The wheel driving device of claim 3, wherein the hub ring is fitted on the output shaft by a ball spline so as to be rotationally fixed but axially slidable relative to the output shaft.

18. The wheel driving device of claim 3, wherein the wheel driving device is an on-board type wheel driving device, wherein the output shaft of the speed reducer is connected to a drive shaft, and the hub ring is connected to the drive shaft so that the hub ring is rotated by the drive shaft.

19. The wheel driving device of claim 1, wherein the internal gear is rotationally fixed to an axial surface of the speed reducer casing.

\* \* \* \* \*